United States Patent [19]

Gsell

[11] Patent Number: 4,906,374

[45] Date of Patent: Mar. 6, 1990

[54] FILTRATION MEDIA WITH LOW PROTEIN ADSORBABILITY

[75] Inventor: Thomas C. Gsell, Glen Cove, N.Y.

[73] Assignee: Pall Corporation, Glen Cove, N.Y.

[21] Appl. No.: 945,569

[22] Filed: Dec. 23, 1986

[51] Int. Cl.$^4$ .............................................. B01D 13/00
[52] U.S. Cl. .............................. 210/490; 210/500.38; 210/654; 210/655; 428/315.7; 428/475.5
[58] Field of Search ................... 210/490, 500.38, 655, 210/638, 654; 428/475.5, 315.5, 315.7, 315.9

[56] References Cited

U.S. PATENT DOCUMENTS

| | | | |
|---|---|---|---|
| 3,524,546 | 8/1970 | Hoehn et al. | 210/500.38 |
| 3,728,290 | 4/1973 | Johansson et al. | 260/2.5 N |
| 3,969,548 | 7/1976 | Hunter et al. | 427/245 |
| 4,183,811 | 1/1980 | Walch et al. | 210/500.29 |
| 4,206,050 | 6/1980 | Walch et al. | 210/500.29 |
| 4,346,142 | 8/1982 | Lazear | 428/315.7 |
| 4,473,474 | 9/1984 | Ostreicher et al. | 210/636 |
| 4,473,475 | 9/1984 | Barnes, Jr. et al. | 210/638 |
| 4,483,771 | 11/1984 | Koch | 210/500.29 |
| 4,604,208 | 8/1986 | Chu et al. | 210/636 |
| 4,619,767 | 10/1986 | Kamiyama et al. | 210/500.42 |
| 4,634,604 | 1/1987 | Tlustakova et al. | 427/213.33 |
| 4,673,504 | 6/1987 | Ostreicher et al. | 210/500.38 |
| 4,707,266 | 11/1987 | Degen et al. | 210/500.38 |
| 4,774,132 | 9/1988 | Joffee et al. | 428/290 |

FOREIGN PATENT DOCUMENTS

| | | |
|---|---|---|
| 0057065 | 8/1982 | European Pat. Off. |
| 0091128 | 10/1983 | European Pat. Off. |
| 1149911 | 5/1966 | United Kingdom |
| 1129009 | 10/1966 | United Kingdom |
| 1303897 | 10/1970 | United Kingdom |
| 1417396 | 1/1972 | United Kingdom |
| 1274870 | 5/1972 | United Kingdom |
| 1486288 | 11/1974 | United Kingdom |
| 2058802A | 4/1981 | United Kingdom |

Primary Examiner—W. Gary Jones
Assistant Examiner—Coreen Y. Lee
Attorney, Agent, or Firm—Leydig, Voit & Mayer

[57] ABSTRACT

A porous polymeric medium having a low affinity for amide group-containing materials is provided comprising a porous polymeric substrate and a surface-modifying polymeric material having a low affinity for amide group-containing materials formed in situ at and covalently bonded to the surface of the porous polymeric substrate, the surface-modifying polymeric material being formed from a monofunctional monomer having at least one hydroxyl group.

16 Claims, No Drawings

FILTRATION MEDIA WITH LOW PROTEIN ADSORBABILITYTECHNICAL FIELD:

The present invention relates to a porous medium having a low affinity for amide-containing materials. More particularly, the present invention is directed to microporous polymeric media useful as filtration membranes having modified surfaces thereon which produce a low propensity to adsorb proteinaceous materials in the resultant surface modified media.

BACKGROUND ART:

In the medical and biological fields, including those involving research, clinical testing and processing, fluids are commonly tested or filteed which contain proteinaceous materials. Many of the media used in diagnostic testing or filtration provide adequate performance with respect to retention of materials sought to be retained, such as solid or gelatinous materials. Commonly, such media used for filtering proteinaceous material-containing fluids also provide rapid flow rates when initially placed in service by virtue of low pressure drops across the membranes. Many of these materials, such as cellulose esters, however, exhibit poor hydrolytic stability and tend to decompose slowly when subjected to continuous use and particularly when exposed to conditions of steam sterilization. There is a tendency by some media, particularly cellulose esters such as cellulose acetate and cellulose nitrate, to decompose as a result of prolonged exposure to solvents or biological materials. In addition, some of these materials tend to be brittle and cellulose nitrate is flammable.

Other media, such as polyamides, particularly nylon, exhibit generally good hydrolytic stability, relatively low flammability and desirable physical properties, such as high strength and flexibility. The polyamides, particularly nylon 66, demonstrate high retention of materials sought to be retained, usually resulting from precise manufacturing control of absolute pore ratings. In many applications, polyamide media are employed in the form of membranes which exhibit low pressure drops across the membrane. However, when such applications involve filtration or passage of solutions containing proteinaceous materials, the pressure differentials across the filtration media frequently increase during use because continued contact of such membranes with proteinaceous materials results in the pores of the membrane being plugged with sorbed proteinaceous material and performance thereby being adversely affected. In many instances, the blockage is irreversible and a costly membrane must be discarded. Thus, a membrane which in most respects is quite suitable for the intended purpose is rendered useless by an undesirable adsorption of proteinaceous material. In some instances, the retained protein may be desired but is rendered unusable and may, therefore, represent a costly loss.

DISCLOSURE OF THE INVENTION

The present invention is directed to porous polymeric media, preferably in membrane form and microporous in nature, useful as filtration media or as diagnostic media. According to the present invention, a porous, preferably microporous, polymeric medium having a low protein affinity or sorbability, particularly adsorbability, is provided which includes a porous, preferably microporous, polymeric substrate or matrix which is preferably liquophilic and most preferably hydrophilic, typically one having a high affinity or sorbability for amide group-containing materials, particularly proteinaceous materials. The surface of the porous polymeric substrate is modified to provide a low affinity for amide group-containing materials, particularly proteinaceous materials. The surface modification is accomplished by incorporation of a second polymeric material rich in pendant hydroxyl groups and having a low affinity for amide group-containing materials at the surface of the polymeric substrate.

When first placed into use, the porous polymeric media of the present invention exhibit desirable filtration characteristics which are quite similar to those of the untreated polymeric substrate from which they are prepared. Thus, unlike many chemically treated porous polymeric media, the media of the present invention commonly demonstrate low levels of extractable contaminants which are comparable to the low levels of untreated membranes. This is important both to manufacturers and users of such materials to whom it is undesirable to employ additional treatment steps prior to use. The media of the present invention also demonstrate fluid flow behavior when first placed into use, particularly with respect to flow rates and pressure drops, similar to or substantially the same as untreated media formed from the same polymeric substrate. However, as compared to the behavior of untreated porous substrates, because of the greatly reduced adsorption of proteinaceous material, the fluid flow properties of the porous polymeric media of the present invention change only gradually with use. Concomitantly, the porous polymeric media of the present invention largely eliminates the loss of protein from a product stream.

The surface-modifying polymer or second polymeric material which is formed on the surface of the polymeric substrate is a polymeric material having pendant hydroxyl moieties. It is formed and covalently bound to the porous polymeric substrate by treating the polymeric substrate with a solution of a suitable hydroxyl-containing monomer and thereafter exposing the treated substrate to ionizing radiation, preferably gamma radiation. Polymerization of the monomer and grafting to the polymeric substrate results. Preferred as monomers to form the surface-modifying polymers are hydroxyl-containing vinylic type monomers. The ionizing radiation employed includes short wavelength ultraviolet radiation or gamma radiation.

BEST MODES FOR CARRYING OUT THE INVENTION:

The present invention is directed to porous polymeric media having low affinity for or adsorbability of amide group-containing materials, such as proteinaceous materials, which media include a porous polymeric substrate or matrix which has been modified at its surface with a second polymeric material rich in pendant hydroxyl groups to provide a low affinity for amide group-containing materials and particularly proteinaceous materials. The affinity of the surface-modified polymeric medium for such materials is much lower than the polymeric substrate from which the medium is formed. The term "proteinaceous materials", as used herein, includes proteins and amino acids and may include substances with sterically accessible amide moieties or substances in which the proportion of amide moieties to other moieties is high. Terms such as "'surface", "polymeric substrate surface", "membrane surface" or like terms, used in the singular or plural, are intended herein to include not only the gross surfaces, i.e., the external or outer surfaces, such as those which are exposed to view, but also the internal surfaces or those surfaces which define the pores of the polymeric substrate or medium, that is, the substrate or membrane surface is that portion of the polymeric substrate or membrane medium which is capable during use of being contacted by a fluid, particularly a liquid. As distinguished from the "polymeric substrate surface area", which refers to the area of both internal and external surfaces, the exposed planar dimensional area of the material is herein referred to as the "polymeric substrate area".

The media of the present invention may be prepared from polymeric substrates which are capable of forming radical species at their surfaces when exposed to ionizing radiation and do not react adversely with the solvents used in the monomer solution. Suitable polymeric substrates have C-H bonds available for abstraction of H atoms and radical formation under the influence of ionizing radiation. When intended as a filtration medium, where passage of liquid through the medium will be encountered, those materials which exhibit desirable flow properties will generally be employed as polymeric substrates. Thus, liquophilic substrates are preferred and hydrophilic media are particularly preferred. However, with proper treatment, such as that known to those familiar with the filtration and related arts, hydrophobic media may also be employed. Liquophilicity, as used herein, refers to the wettability of the substrate or membrane medium by the liquid(s) with which it is contacted. The wettability or liquophilicity of a solid structure, e.g., a membrane, is a function of that structure's critical surface energy and the surface tension of the applied liquid. If the critical surface energy is at least as high as the surface tension of the liquid, the liquid will spontaneously wet the solid structure. For example, a microporous membrane having a critical surface energy of 72 dynes/cm or higher will be wetted by water which has a surface tension of 72 dynes/cm, i.e., it is hydrophilic.

The capability of a porous structure (substrate, medium, membrane, etc.) to be wetted by a liquid can be determined by placing a drop of liquid on the porous structure. The angle of contact provides a quantitative measure of wetting. A very high angle of contact indicates poor wetting, while a zero angle of contact defines complete or perfect wetting. Materials used in the subject invention as the substrate and also the completed medium are characterized, preferably, as being readily or spontaneously wetted by the applied liquid and have a low angle of contact with the applied liquid. Indeed, when a drop of a liquid(s) used with the porous structures of the present invention is placed on a preferred spontaneously wettable or liquophilic microporous sustrate or medium formed therefrom, the drop of liquid penetrates and wets the substrate or medium, effectively providing a zero angle of contact therewith.

Among the porous polymeric substrates which are typically employed in the present invention are melt spun webs and, preferably, because of their fine and uniform pore structure, membranes which normally exhibit a high affinity toward amide group-containing materials, particularly proteinaceous materials. Examples of such materials are polyamides, polysulfones, and polyacrylonitrile. Particularly preferred for use in the present invention are polyamides, such as the nylons, among which the preferred nylons include polyhexamethylene adipamide, poly-$\epsilon$-caprolactam, polymethylene sebacamide, poly-7-aminoheptanoamide, or polyhexamethylene azeleamide, with polyhexamethylene adipamide (nylon 66) being most preferred. Particularly preferred are skinless, substantially alcohol-insoluble, hydrophilic polyamide membranes. These membranes are also characterized as having a ratio of methylene $CH_2$:amide NHCO within a range of about 5:1 to about 7:1.

The present invention may also use polymeric substrates which exhibit lower affinity to proteinaceous materials. Examples of such materials would include cellulose esters, such as cellulose nitrate, polyolefins, such as polyethylene and polypropylene, polyesters, such as polyethylene terephthalate and polybutylene terephthlate, and fluoropolymers, such as polyvinylidene difluoride and polytetrafluoroethylene.

When the porous polymeric media of the present invention are employed as filtration media, they have low blockage or resistance to flow, typically characterized by absolute pore ratings (pore diameters) in the range of about 0.05 to about 100 microns, preferably about 0.1 to about 30 microns. When a membrane is employed as the substrate, the preferred pore diameter range preferably corresponds to that of a microporous medium, typically about 0.05 to about 10 microns, preferably about 0.1 to about 3 microns. The porous polymeric media of the present invention have thicknesses of about 0.0005 to about 0.050 and, when employed as filtration media, suitably have thicknesses of about 0.0005 to about 0.020 inch (about 0.0125 to about 0.50 mm), typically about 0.001 to about 0.010 inch (about 0.0255 to about 0.255 mm). The voids volume (percentage voids) of materials primarily intended as filtration media are suitably about 30 to about 95 percent, typically about 50 to about 90 percent. Preferred as the porous polymeric substrates of the present invention are the hydrophilic membranes described in U. S. Pat. No. 4,340,479, assigned to Pall Corporation and incorporated herein by reference. A membrane material of this description which is particularly useful for the present invention is available from Pall Corporation under the trademark ULTIPOR $N_{66}$ TM.

The second polymeric material, which has a low affinity for proteinaceous materials, may be any polymeric material which may be formed in situ on the polymeric substrate from a monofunctional unsaturated monomer rich in pendant hydroxyl groups or groups capable of reacting to form hydroxyl groups, particularly after or upon formation of the second polymeric material, and which is capable of undergoing polymerization and covalently bonding to the substrate under the influence of ionizing radiation. Terms such as "monofunctional", "functional groups", "functionality", as used herein in describing monomers suitable for use in the present invention, refer to those functional groups which are believed to be responsible for polymerization and bonding to the polymeric substrate. While not wishing to be bound to any particular theory, it is believed that under the influence of ionizing radiation unsaturated bonds in the monomer molecules enter into polymerization and cross-linkiing reactions with other monomers and into reactions which form bonds to the substrate. Particularly preferred is vinylic or ethylenic unsaturation. Monomers suitable for use in the present invention have but a single functional group, that is, a single unit of unsaturation. However, while those monomers preferred in the present invention have a single hydroxyl group, those compounds with a plurality of hydroxyl groups are also suitable. The pendant hydroxyl groups, or groups capable of forming same, required in the monomer and second polymeric material are in large part responsible for the low protein sorbing characteristics of the invention. Suitable as second polymeric materials are those materials which provide in the modified medium a low adsorption of proteinaceous material as measured by the Bovine Serum Albumin Adsorption Test discussed in greater detail below. According to this test, polymers which adsorb less than 100 micrograms/cm$^2$ of proteinaceous material are considered, for purposes of the present invention, to have a low affinity for proteinaceous materials, and materials adsorbing less than 35 micrograms/cm$^2$ are preferred. Conversely, for purposes of the present invention, polymers which adsorb more than about 100 micrograms/cm$^2$ of proteinaceous material are considered to have a high affinity for proteinaceous material.

The second polymeric material forming the modified surface of the medium is derived from monomers having moieties characterized by ethylenic or vinylic unsaturation and hydroxyl groups. However, preferred compounds may also include other groups, such as carboxylate moieties, hydroxy or hydroxy-forming substituted acrylate esters being exemplary. Particularly preferred as monomers are hydroxyalkyl acrylates in which the "alcoholic" or hydroxyl-containing portion of the molecule (as opposed to the portion of the molecule "derived" from a carboxylic acid) constitutes a substituted lower alkyl group having from 2 to 5 carbon atoms, preferably from 2 to 3 carbon atoms. The substituent is preferably a hydroxyl group, although a substituent capable of reacting to form a hydroxyl group may be present. Mixtures of monomers may also be used. The hydroxyl-containing monomers and/or the hydroxyl-containing polymeric material formed thereform which are most preferred are those in which the hydroxyl group is pendant. By "pendant" is meant the group is not attached to a carbon atom which forms part of the polymer's backbone but is bound to a carbon atom that is separated from the backbone as, for example, a branching carbon atom.

Exemplary of preferred monomers are such compounds as 2-hydroxyethyl acrylate, 2-hydroxyethyl methacrylate, 3-hydroxypropyl acrylate, and 3hydroxypropyl methacrylate. These compounds are available commercially from Rohm and Haas Chemical Company under the trademark ROCRYL and are designated ROCRYL 410, 400, 430, and 420, respectively. Alternatively, these and other compounds suitable for use in the present invention may be obtained either from commercial sources or may be prepared by reactions and techniques known to the organic chemist.

In addition to the structural features designated above, suitable monomers may be further characterized by their properties, such as responding to ionizing radiation by forming a free radical. Suitable monomeric compounds should also be substantially completely, if not totally, soluble in the solvent systems employed in the present invention. A solvent is employed which will maximize solubility, not adversely affect the polymeric substrate nor the monomer employed, while permitting a satisfactory polymerization. Preferred solvents include polar solvents, particularly hydroxylated solvents such as water, lower aliphatic alcohols, such as ethanol, and mixtures thereof.

Solutions of the monomer compound used in the present invention range in concentration of the monomer(s) from about 0.1 to about 5.0 percent, by weight, preferably about 0.2 to about 3.0 percent, by weight, based on the total weight of solution. The concentration of the second or surface-modifying polymeric material and, therefore, the concentration of the monomer used to form the second polymeric material is selected so as to provide the porous polymeric medium with a substantially lower affinity for proteinaceous materials. However, a concentration sufficiently high to result in "plugging" of the substrate so as to adversely affect the flow properties of the media is to be avoided.

The particular procedure used to saturate the porous polymeric support is not particularly critical sand methods known to one of skill in the art may be employed. For example, in a batch process, a portion of the substrate may be immersed in a solution of the monomer compounds used to form the second or hydroxyl-containing polymer for sufficient time to "saturate" or impregnate the polymeric substrate, i.e., penetrate the pores of the substrate. In a continuous process, the substrate is passed through the solution of components for sufficient time to saturate the substrate.

When the preferred hydrophilic porous polymeric substrate is employed to prepare the porous polymeric media, no pretreatment is required. However, when a liquopobic, particularly hydrophobic, material is employed as the substrate, it must be wetted prior to saturation or impregnation with the monomer containing solution. Wetting may be accomplished by contacting the hydrophobic substrate with a liquid, such as water, containing a wetting agent or with a water miscible liquid having a lower surface tension than water, such as a lower aliphatic alcohol, particularly ethanol or a mixture of ethanol and water. In those situations in which the liquid or solution used to wet the hydrophobic polymeric substrate interferes with the grafting step, the wetting agent may be displaced from the substrate by contacting and saturating the substrate with the solvent in which polymerization is conducted, such as water, providing that the two liquids are substantially miscible. Thereafter, the solvent-saturated, preferably water-saturated, hydrophobic substrate may be contacted with the monomer solution in the same manner as a hydrophilic substrate. Alternatively, the monomer solution employed may be prepared with a solvent system, such as an aqueous solvent system, containing a low concentration of a miscible, lower surface tension solvent, such as alcohol, when such alcohol does not adversely affect the grafting step, thereby promoting wetting and impregnation of the substrate.

The preferred manner of irradiating the surface of the porous or microporous polymeric substrate, which also includes retained monomer solution, depends to some extent on the type of ionizing radiation to which the surface-treated polymeric membrane is exposed. If the preferred method, gamma radiation, is employed, it is frequently preferred to treat the membrane in bulk, that is, for example, a wound roll of the monomer treated polymeric substrate is commonly irradiated. With this procedure, prior to irradiation the membrane material may typically be unwound, passed through a monomer-containing solution, and then rewound, or, alternatively, the entire roll of membrane material may be immersed in the monomer-containing solution. When polymerization and cross-linking are accomplished by exposure to ionizing ultraviolet radiation, a continuous procedure is preferred. In this instance, a typical procedure involves passing a microporous membrane material through a monomer-containing solution and then passing the monomer treated porous membrane material to an irradiation zone.

When gamma radiation is the energy source employed to effect polymerization, in the preferred procedure, the roll of polymeric substrate saturated with monomer solution, is "degased"; that is, the monomer solution-containing roll is treated in some manner so as to remove the air which is present in the solution. This may be accomplished by a procedure which involves displacing the air with an inert gas, such as helium, argon, krypton, etcetera, or, preferably, by subjecting the monomer solution-containing roll to reduced pressure. Thereafter, the roll may be suitably sealed in an air-free package until it is ready to be irradiated. Since the monomer solution-containing polymeric porous membrane is irradiated directly in the package, a packaging material is selected which does not significantly impede penetration by gamma radiation but is resistant to the degradative effects thereof. Suitable packaging materials may include many plastics, thin metal (other than lead) sheets, and borosilicate glass.

A suitable dosage of gamma radiation will be sufficient to effect polymerization and formation of covalent bonds between the polymeric substrate and the hydroxyl-containing surface-modifying polymer but insufficient to cause the hydroxyl-containing surface-modifying material to block the pores of the media to the extent that the flow properties of the membrane material are adversely affected. In other words, the pressure drop across the treated or modified membrane is not noticeably greater than that of the untreated substrate. Suitably, a dosage of about 0.2 to about 10 megarads is employed and preferably about 0.5 to about 3 megarads is used. Typically, an exposure of from about 5,000 to about 150,000 rads per hour is used for a typical irradiation period of about 4 to about 60 hours.

When the energy source for the ionizing radiation used to form the second polymeric material at the surface of the substrate is ultraviolet radiation, the impregnated media are typically exposed to ultraviolet radiation of suitable frequency and intensity to effect polymerization of the monomer compound and grafting of the crosslinked polymer to the substrate media. This will vary to some extent with the monomer, the substrate, and conditions employed. Typically, the latter includes an emission in the range of about 180 to about 420 nanometers. Lamp intensity is typically about 100 to about 200 watts/cm$^2$.

Any UV source which emits light in wavelengths suitable for the present invention and does not at the same time produce an excessive amount of heat may be used. A preferred source of UV radiation is a medium pressure, ozone-free mercury lamp, such as that manufactured by American Ultraviolet Company, Model C10012A. Although many irradiation sources and arrangements may be employed in the present invention, an arrangement which has been shown to be effective is one which employs an aluminum housing having an integrated reflector design, the reflector having an elliptical cross-section. When used in the present invention, the mercury lamp is located at one focal point of the ellipse and the substrate-impregnated surface is positioned at or in the vicinity of the other focal point.

As indicated above, the distance of the lamp to the membrane has an effect on the polymerization and grafting of the acrylic monomers and crosslinking agent. Depending upon the type of ultraviolet light source or lamp employed, a suitable distance from the surface being irradiated is about ½ to about 8 inches, preferably about ¾ to about 6 inches, and most preferably about 4-½ inches.

In a continuous operation, the line speed of the moving medium will depend at least in part on such factors as the distance of the impregnated substrate from the ultraviolet light source, the temperature within the housing in which irradiation is conducted, and the composition of the solvent system. A preferred line speed is one effective in producing the surface-modified product and typically is about 5 to about 50 feet per minute, preferably between about 20 and about 30 feet per minute. Line speeds within these ranges are most effective in producing media which are most readily wetted with water. The impregnated membrane is irradiated for a period of from about ½ to about 2 seconds, preferably about 1 second.

Regardless of the radiation technique employed, the surface-modified porous polymeric media must be thoroughly rinsed to remove substantially all residual monomer and polymer which is not covalently bound to the polymeric substrate. Any technique which accomplishes this purpose and generally known to the art, such as batch-wise soaking of the membrane followed by draining, passing the washing agent or solvent through the porous membrane, or exchanging water or water/alcohol mixtures, may typically be employed. The preferred washing agent is water, particularly deionized water, although the same solvent system used to form the monomer solution may also be used. The washing procedure may be conducted adequately at about ambient temperature.

Drying and curing may be accomplished by techniques commonly employed in radiation polymerization. Examples of suitable techniques include the use of an enclosed oven, an infrared oven, or by contact between the monomer treated substrate and a heated metal drum. When batch drying is performed on smaller portions of the treated medium, shrinkage may be reduced by securing the medium to a frame before drying.

Hydrophilic porous polymeric media produced according to the present invention demonstrate high fluid-permeability. More significantly, however, as the examples show, these media have protein adsorption levels, as determined by the Bovine Serum Albumin Protein Adsorption Test, of about 50% to about 1%, typically about 20% to about 1.5%, of the untreated substrate.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents and alternatives falling within the spirit and scope of the invention.

EXAMPLES

Example 1—Preparation Of A Monomer Solution:

An aqueous solution of 3-hydroxypropyl acrylate (HPA) (Rocryl ™ TM 430 from Rohm and Haas) was prepared by adding 2 parts HPA to a solvent system containing, by volume, 96 parts of deionized water and 2 parts tertiary butyl alcohol. The solution was stirred until uniformly mixed, producing a 2%, by volume, concentration of HPA.

Example 2—Preparation Of A Porous Polymeric Medium Having Low Affinity For Proteinaceous Material:

A 200 foot ×10 inch roll of microporous nylon 66 (ULTIPOR $N_{66}$, available from Pall Corporation) was contacted with the 2.0 volume percent solution of hydroxypropyl acrylate prepared in Example 1. The microporous nylon substrate, in roll form, was immersed in the monomer solution and allowed to become completely saturated. No attempt was made to remove excess solution from the roll. The saturated roll was transferred to and sealed in an irradiation chamber, specifically a stainless steel vessel having a wall thickness of 0.030 inch.

The roll was exposed to gamma radiation at a dose rate of 25,000 rads/hour for a total of 60 hours for a total dose of 1.5 megarads. The roll was then removed from the vessel and washed to remove residual monomer and ungrafted polymer by allowing deionized water to circulate around the roll for 24 hours. A small section of medium was removed from the roll, clamped in a frame, and dried for 15 minutes at 100 degrees C for subsequent testing.

Example 3—Bovine Serum Albumin (BSA) Protein Adsorption Test:

The BSA protein absorption test is performed according to a standardized procedure. In this procedure, a solution containing 0.1 mg/ml unlabelled BSA and about $10^5$ cpm/ml $^{125}$I-labelled BSA was prepared in a phosphate buffered saline (PBS) solution having a pH of 7.2. The PBS solution contained 0.2 grams per liter of monobasic sodium phosphate, 1.2 grams per liter of anhydrous, dibasic sodium phosphate, and 8.77 grams per liter sodium chloride in deionized water.

A sample of a porous test medium was placed in a syringe-type filter holder. Fluid communication between a reservoir holding the BSA test solution and the syringe-type filter was provided by a length of Tygon ™ tubing and a peristaltic pump arranged in series. Prior to insertion of a porous test medium sample into the filter holder, the potential non-specific protein binding sites on both the tubing and the filter holder were blocked by recirculating 1.0 ml of the BSA solution through the tubing and filter holder at a flow rate of 0.3 ml/min for a period of 15 minutes. Following recirculation, the BSA solution was drained from the tubing and filter holder. Residual BSA solution was removed from the tubing and filter holder by circulating about 2.0 ml of PBS through the tubing and filter holder at a flow rate of about 0.3 ml/min for several minutes at ambient temperature.

A 13 mm diameter disc of porous polymeric test medium was placed into the blocked filter holder. The $^{125}$I-BSA solution was then transferred from the reservoir to the filter holder at a flow rate of 0.8 ml/min/cm$^2$. The test was continued for a period of 5 minutes, during which time 391 micrograms/cm$^2$ of BSA were transferred to the filter holder. The test medium was then removed from the filter holder and blotted dry on filter paper. The amount of protein (BSA) adsorbed by the membrane disc was determined by radioactive counting in a gamma counter.

The results reported in Table 1 are for untreated membranes and membranes treated according to Examples 1 and 2 to provide a porous medium having a low affinity for proteinaceous material. These results provide the amount of BSA adsorbed by the membrane divided by the effective filtration area.

TABLE 1

| BSA PROTEIN ADSORPTION | |
|---|---|
| Product Of Examples 1 And 2 | 2.2 Micrograms/cm$^2$ |
| Untreated Membrane Employed In Example 2 | 242 Micrograms/cm$^2$ |

Example 4—Permanence of Polymerization and Grafting Treatment

Porous polymeric filter membranes prepared according to Examples 1 and 2 were subjected to extensive washing with water at 34 degrees C at the flow rates indicated in Table 2. Thereafter, the membranes were tested for BSA protein adsorption with the results set forth below.

TABLE 2

| Flow Rate (liters/minute/Ft$^2$) | Total Water Passed (liters/ft$^2$) | BSA Protein Adsorption (micrograms/cm$^2$) |
|---|---|---|
| 2 | 80 | 2.5 |

The above results suggest that a procedure for forming a grafted porous polymeric media employing covalently bound groups rich in hydroxyl content, such as the hydroxypropyl acrylate used in Examples 1 to 3, results in a membrane having a relatively permanently bound low-affinity material with respect to washing with water.

I claim:

1. A porous polymeric medium having a low affinity for amide-group containing materials comprising:
    a porous polymeric substrate; and
    a surface-modifying polymeric material having a low affinity for amide group-containing materials formed in situ at and covalently bonded directly to the surface of said porous polymeric substrate, said surface-modifying polymeric material being derived from an unsaturated monofunctional misnomer having at least one hydroxyl group.

2. The porous polymeric medium of claim 1 wherein said polymeric substrate comprises a material having C-H bonds capable of forming radicals under the influence of ionizing radiation.

3. The porous polymeric medium of claim 1 wherein said porous polymeric substrate comprises a polyamide.

4. The porous polymeric medium of claim 3 wherein said polyamide is nylon 66.

5. The porous polymeric medium of claim 1 wherein said porous polymeric substtrate comprises a hydrophilic material.

6. The porous polymeric medium of claim 1 wherein said polymeric material comprises a material rich in pendant hydroxyl groups.

7. The porous polymeric medium of claim 1 wherein said porous polymeric substrate is microporous.

8. The porous polymeric medium of claim 1 wherein said porous polymeric substrate and said medium are microporous.

9. The porous polymeric medium of claim 1 wherein said monomer from which said surface-modifying polymeric material is formed comprises an ethylenically unsaturated compound.

10. The porous polymeric medium according to claim 9 wherein said monomer is an hydroxyalkyl acrylate or methacrylate.

11. The porous polymeric medium according to claim 10 wherein the hyroxyalkyl group contains 2 to 5 carbon atoms.

12. The porous polymeric medium according to claim 9 wherein said monomer is 2-hydroxypropyl arylate, 2-hydroxypropyl metharylate, 3-hydroxypropyl acrylate, 3-hydroxypropyl methacrylate, or mixtures of the foregoing monomers.

13. The porous polymeric medium of claim 1 wherein said amide group-containing material comprises proteinaceous material.

14. The porous polymeric medium of claim 13 wherein said medium has an adsorption of proteinaceous material measured by the Bovine Serum Albumin Adsorption Test of less than 100 micrograms per square centimeter.

15. The porous polymeric medium according to claim 1 wherein said monomer is a monomer capable of polymerizing and forming a polymer and covalently bonding to said porous polymeric substrate under the influence of ionizing radiation.

16. A porous polymeric medium having a low affinity for amide group-containing materials comprising:
a porous polymeric substrate; and
a hydroxyl-containing surface-modifying polymeric material having a low affinity for amide group-containing materials formed in situ at and covalently bonded directly to the surface of said porous polymeric substrate, said surface-modifying polymeric material being derived from an unsaturated monofunctional monomer having at least one hydroxyl group or group capable of forming same.

* * * * *

UNITED STATES PATENT AND TRADEMARK OFFICE
CERTIFICATE OF CORRECTION

PATENT NO. : 4,906,374

DATED : March 6, 1990

INVENTOR(S) : Thomas C. Gsell

It is certified that error appears in the above-identified patent and that said Letters Patent is hereby corrected as shown below:

Claim 1, column 10, lines 46 and 47, change "misnomer" to --monomer--.

Claim 5, column 10, line 57, change "substtrate" to --substrate--.

Claim 12, column 11, line 10, change "arylate" to --acrylate--;

line 11, change "metharylate" to --methacrylate--.

Signed and Sealed this

Twenty-first Day of January, 1992

Attest:

HARRY F. MANBECK, JR.

*Attesting Officer*  *Commissioner of Patents and Trademarks*